Jan. 21, 1964   J. F. LOCH ETAL   3,119,000
COOKING APPLIANCE

Filed Jan. 8, 1962   9 Sheets-Sheet 1

Fig. 1.

Inventors:
Joseph F. Loch,
Alfred E. DeMott,
William Smigo
by T G Dysart
Their Attorney

Inventors:
Joseph F. Loch,
Alfred E. DeMott,
William Smigo
by T G Dysart
Their Attorney

Fig. 6.

Inventors:
Joseph F. Loch,
Alfred E. DeMott,
William Smigo
by TG Dysart
Their Attorney Inventors:
Joseph F. Loch,
Alfred E. De Mott,
William Smigo.
by TG Dupont
Their Attorney

HEAT RESPONSIVE MEMBER 98

AMBIENT AIR IN CHAMBER 2

TEMPERATURE

TIME

Inventors:
Joseph F. Loch,
Alfred E. DeMott,
William Smigo
by T G Dysart
Their Attorney United States Patent Office 3,119,000
Patented Jan. 21, 1964

3,119,000
COOKING APPLIANCE
Joseph F. Loch, Alfred E. De Mott, and William Smigo, Allentown, Pa., assignors to General Electric Company, a corporation of New York
Filed Jan. 8, 1962, Ser. No. 164,774
27 Claims. (Cl. 219—19)

This invention relates to electric cooking appliances, and more particularly to a portable appliance of this type capable of performing a variety of cooking functions including toasting, baking and warming operations.

Portable electric cooking appliances adapted to perform certain specialized operations are of course well known, the most common type being the two slice pop-up toaster which has been available on the market for a number of years. Portable electric ovens are also available in various forms capable of performing baking operations and the like. Each of these cooking appliances has certain desirable features which have led to their acceptance and widespread use by housewives. Pop-up toasters perform well in toasting ordinary bread slices, they are low in cost, and of course are designed for operation on ordinary 115 volt wiring circuits. Portable ovens may be utilized for many baking operations, are relatively low in cost (as compared with conventional electric ranges and built-in wall ovens) and are also designed for 115 volt operation.

However, neither the pop-up toaster nor the portable oven is particularly useful or effective in toasting or heating a number of food products such as English muffins, sweet rolls and pastry, sandwiches and the like. Such food products cannot be satisfactorily toasted in a pop-up toaster and some of them cannot be placed in such a toaster at all. If they are heated in a conventional portable oven the process is both slow and inefficient, and in a number of cases the results are unsatisfactory.

Thus a need has existed for a portable cooking appliance which would be capable of performing efficiently all toasting operations, regardless of the shape of the food product, and also capable of performing a variety of baking operations at a pre-selected automatically controlled temperature. With regard to the latter function, an increasing number of frozen or refrigerated uncooked or partially cooked food products such as biscuits, rolls, meat pies and the like have appeared on the market. These items do not require a large oven enclosure for preparation but rather may be heated to serving temperature in an oven even smaller than conventional portable ovens.

The general object of the present invention is to provide a portable automatic cooking appliance capable of toasting a wide variety of food products to a predetermined degree of brownness, and also capable of baking operations in an enclosed space which is automatically maintained at a pre-selected temperature.

Another object of the invention is to provide a cooking appliance of the aforesaid character in which a single heat responsive element controls both toasting and baking operations.

Another object of the invention is to provide a cooking appliance of the aforesaid character including horizontal food supporting means and vertically spaced heating elements so arranged that food products of widely varying size and shape may be toasted or baked.

Still another object of the invention is to provide a cooking appliance of the character specified in the preceding paragraph in which a door and the food supporting means are so interconnected with the temperature controlling means that the food being heated is automatically moved from within the cooking appliance to a position easily accessible to the housewife when the cooking operation is terminated.

Briefly stated, in accordance with one aspect of our invention we provide a portable electric cooking appliance comprising a cooking chamber having a front opening and a door for closing the opening, a horizontal food rack located in the chamber in spaced relation between upper and lower heating units, and a heat responsive member positioned between the lower heating unit and the rack arranged to respond to the surface temperature of toast or the like during toasting operations and also to air temperature in the cooking chamber during baking operations. The heating units are connected in an electrical circuit which includes a switching device operated by the heat responsive member and a manually variable control for setting the degree of brownness during toasting operations and also the baking temperature during baking operations.

Preferably the food rack is mounted for movement into and partially out of the cooking chamber through the front opening, and the food rack, the door and the temperature control system are interconnected so that the rack is shifted to an easily accessible position upon termination of a cooking operation. The parts are so arranged that shifting of the rack out of the cooking chamber is automatic in the case of toasting, and is effected by a manually operable element during baking. A food supporting tray arranged to be supported on the rack is provided for baking operations, the tray serving to aid in maintaining proper baking temperatures and also to collect any drippings from the food.

The subject matter which we regard as our invention is particularly pointed out and distinctly claimed in the concluding portion of this specification. However, the organization and method of operation of our invention, together with further objects and advantages thereof, may be best understood by reference to the following description taken in connection with the accompanying drawings in which:

Figure 1:
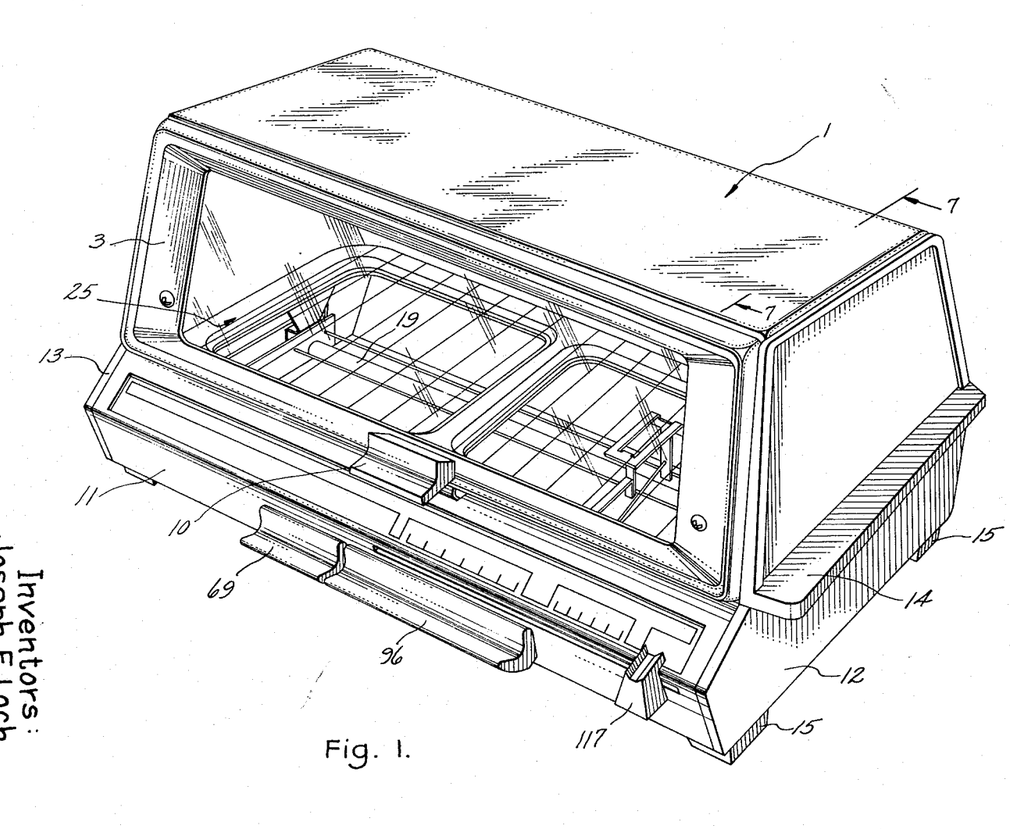
FIG. 1 is a perspective view of a cooking appliance embodying the present invention.
Figure 2:
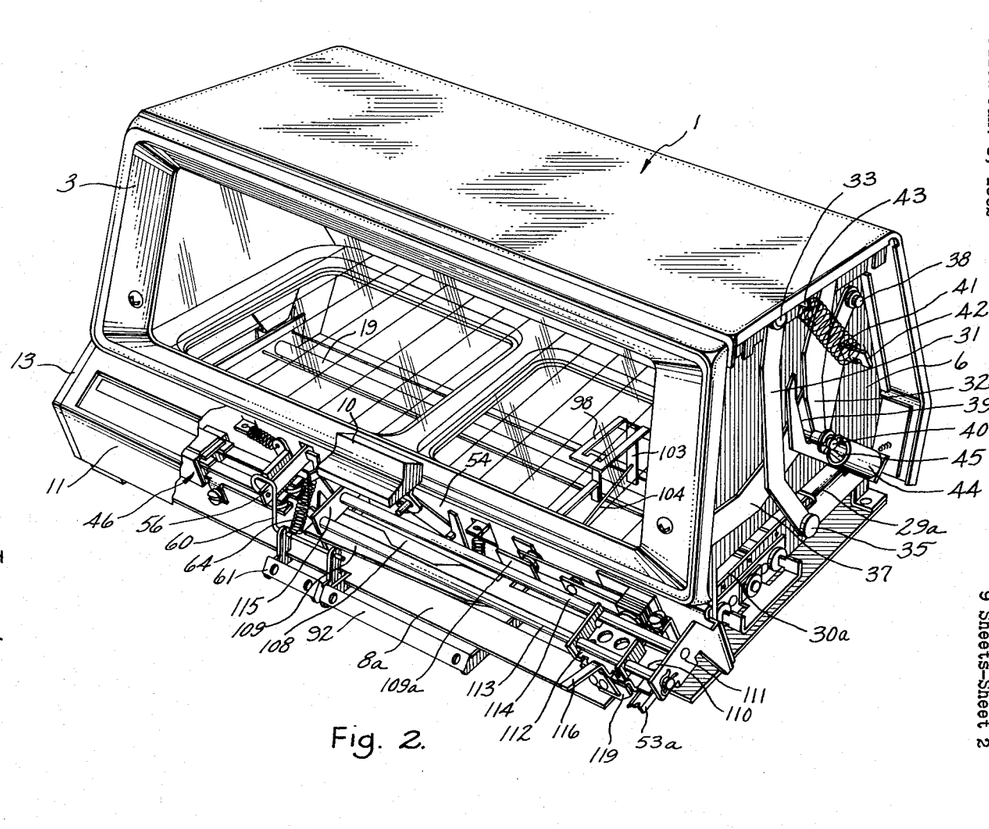
FIG. 2 is similar to FIG. 1 but shows some of the parts broken away to show details of construction.

Referring to the drawings, the numeral 1 generally designates a portable cooking appliance having a cooking chamber 2 therein provided with a front opening in which a door 3 is mounted. Door 3 is preferably provided with a heat resistant glass window 4 so that the interior of the cooking chamber can be observed during cooking operations. Cooking chamber 2 is formed by a pair of side walls 5 and 6, top wall 7, bottom wall 8 and rear wall 9, all of which are preferably formed from sheet metal. Extending forwardly from the plane of door 3 and immediately below door handle 10 secured thereto is a protruding wall member 11 forming a compartment in which various control components are located. As shown in FIG. 2, walls 7, 8 and 9 extend outwardly beyond side walls 5 and 6, thus providing space for a door and food supporting rack linkage arrangement to be described below. A pair of end closure members which are preferably made of a molded plastic material are secured to the respective extending end portions of walls 7, 8 and 9 so as to completely enclose the aforesaid linkage arrangement. End enclosure member 12 is formed with a handle portion 14 and feet 15, and of course closure member 13 is formed in a similar manner.

Figure 7:
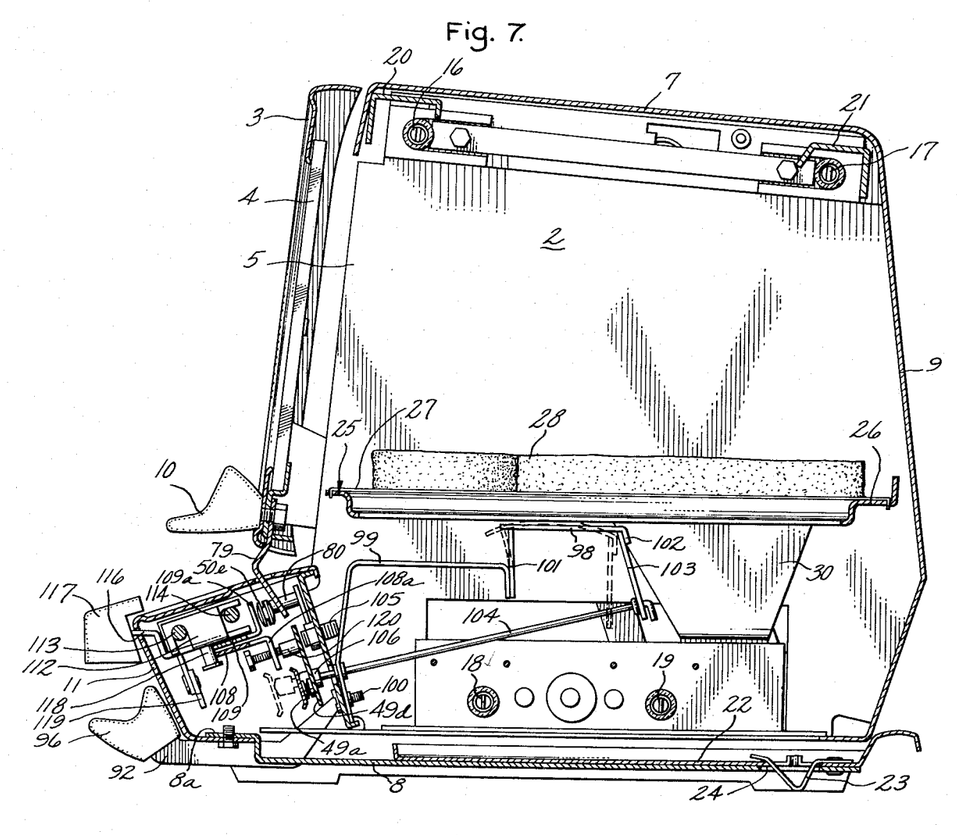
FIG. 7 is an enlarged cross-sectional view taken along the line 7—7 in FIG. 1.

Mounted within cooking chamber 2 adjacent top wall 7 are a pair of electric heating elements 16 and 17 and a similar pair of electric heating elements 18 and 19 are mounted adjacent bottom wall 8. Heating units 16, 17, 18 and 19 are formed from coiled resistance wire enclosed within an elongated quartz tubular member and extend substantially the entire width of the cooking chamber. The heating elements are supported in fixed relation to walls 5 and 6 and their terminals extend therethrough. Thus the electrical wiring for supplying current to the heating units may be located in the enclosed space between end wall 6 and end closure 12 and between end wall 5 and end closure 13. Heating units 16 and 17 are arranged to radiate heat downwardly into the cooking chamber 2 and accordingly elongated reflectors 20 and 21 are mounted in the upper portion of the chamber adjacent top wall 7 as shown in FIG. 7. Reflectors 20 and 21 extend along substantially the entire width of the cooking chamber and cooperate with heating elements 16 and 17, respectively. Heating elements 18 and 19 function to radiate heat upwardly into the cooking chamber, and are aided in this respect by a combination reflector and crumb tray 22 which is removably supported on bottom wall 8. Preferably a spring latch 23 is mounted on crumb tray 22 so as to cooperate with an aperture 24 in the bottom wall 8 so that it is releasably retained in the position shown in FIG. 7.

A horizontal food supporting rack 25 is positioned in cooking chamber 2 in an intermediate location between upper heating units 16 and 17 and lower heating units 18 and 19. In order to permit articles of food supported on rack 25 to be heated from the bottom as well as the top the rack comprises a rectangular frame 26 and a plurality of parallel lengths 27 of stainless steel wire secured under tension to the front and rear edges of the rack. Thus when a slice of bread or the like 28 is being toasted, as illustrated in FIG. 7, its bottom surface is exposed to radiation from heating elements 18 and 19, and receives substantially the same amount of radiation as does the top surface from heating elements 16 and 17.

Food rack 25 is mounted in chamber 2 for forward movement through the front opening thereof and is interconnected with door 3 so that opening movement of the latter causes forward movement of the rack. Referring to FIGS. 2, 3, 4 and 7, the side edges of food rack 25 adjacent end walls 5 and 6 are provided with supporting members 29 and 30 extending downwardly therefrom. While only the right-hand rack supporting arrangement shown in FIG. 2 will be described in detail, it will be understood that the left side of rack 25, as viewed in FIG. 2, is supported in a substantially similar manner.

Supporting member 29 includes a horizontally extending portion 29a arranged to extend through a slot 30a which extends horizontally adjacent the lower edge of end wall 6. Portion 29a of support member 29 is arranged to move horizontally within slot 30a and is supported on a pair of generally parallel links 31 and 32. Link 31 is pivotally mounted at its upper end with respect to end wall 6 by means including a pivot pin 33 while link 32 is pivotally mounted at its upper end by means including a pivot pin 34 secured to the end wall structure in laterally spaced relationship to pivot pin 33. Similarly, the lower end of link 31 is pivotally secured to support portion 29a by pivot pin 35 while the lower end of link 32 is pivotally secured to support portion 29a by a pivot pin 36 which is laterally spaced with respect to pivot pin 35. Thus food rack 25 may be moved from its position within the cooking chamber, shown in FIG. 3 to its forwardly extending position shown in FIG. 4, and by virtue of the pivoted linkage supporting arrangement it moves in substantially a horizontal plane.

Figure 3:
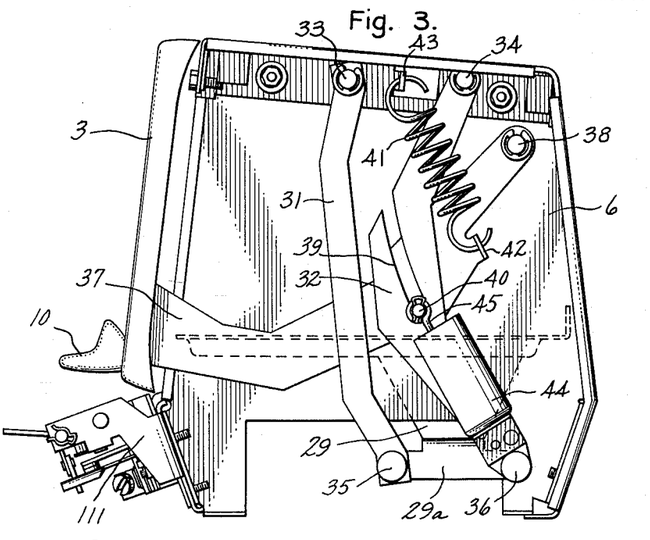
FIG. 3 is a side elevation view of the cooking appliance, some of the parts being broken away or removed to show details of construction.
Figure 4:
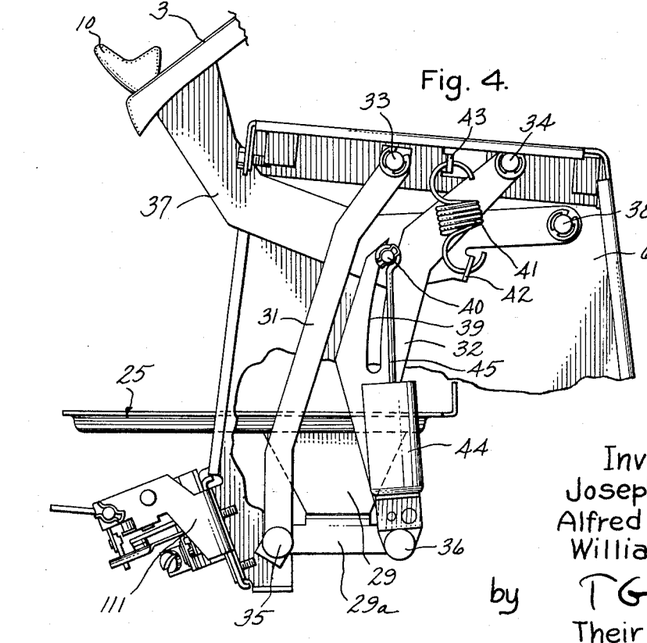
FIG. 4 is similar to FIG. 3 but shows the parts in a different position.

Door 3 is supported on the wall structure of cooking appliance 1 by means of a pair of rearwardly extending hinge arms 37 secured to the side edges of the door. As shown in FIGS. 3 and 4, hinge arm 37 is pivotally mounted at the upper rear portion of side wall 6 by means of a pivot pin 38. Thus in moving from the closed position shown in FIG. 3 to the open position shown in FIG. 4, door 3 moves in a wide arc and its path of movement extends only a very short distance in front of the forwardmost portion of the cooking appliance thereby minimizing the possibility of contact with articles resting on the table top close by. As previously mentioned, door 3 and rack 25 are interengaged so that opening movement of the door causes the rack to move forwardly. This is accomplished by providing a curved slot 39 in link 32 and securing a pin 40 on arm 37 arranged to ride in slot 39. As the door 3 is opened pin 40 engages the forward edge of slot 39, as viewed in FIGS. 3 and 4, and causes link 32 to move forwardly. This movement is of course transmitted to rack 25 which is pivotally supported by link 32 as well as link 31. Door 3 is biased to its open position by a coil spring 41 secured at one end to a lug 42 on arm 37 and at its other end to a lug 43 carried by the end structure of the appliance. In order to limit the rate of opening movement of the door, a dash-pot 44 is pivotally secured at one end to pivot pin 36 with its plunger rod 45 pivotally secured to pin 40. It will be understood that dash-pot 44 is of conventional design and functions to resist rapid movement of door 3 during opening. It will also be understood that door 3 is retained in its closed position by latch structure which will be described below.

The curved shape of slot 39 and the orientation and spacing of the various pivot pins on which arm 37 and links 31 and 32 are mounted brings about a desirable ratio of door movement to rack movement which assures that the lower edge of the door will not interfere with outward movement of relatively thick food products such as meat pies and loaf cakes. In other words, the arrangement shown in FIGS. 3 and 4 assures that door 3 initially moves rapidly in opening while the rack moves forward relatively slowly at first and completes approximately one-half of its movement after the door is two-thirds open.

Figure 13:
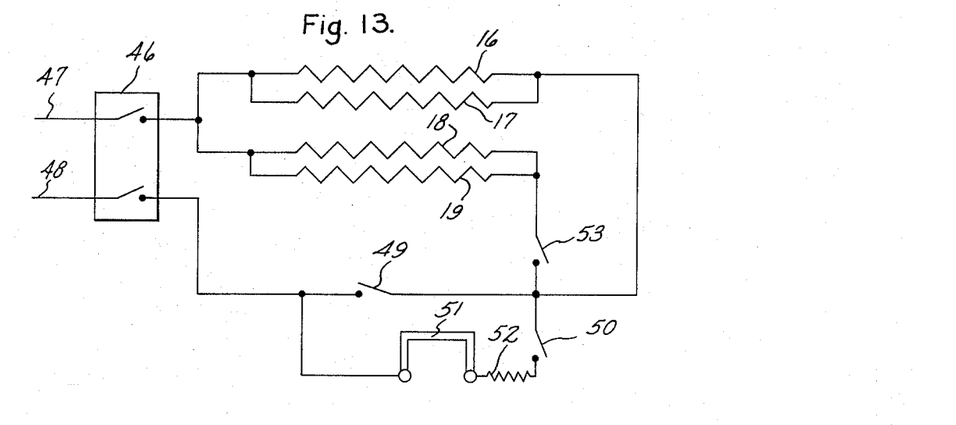
FIG. 13 is a wiring diagram of the control heating and control circuit of the cooking appliance.

Before describing the structural features of the control arrangement which permits cooking appliance 1 to be used either as an automatic toaster, a top side browning oven or a thermostatically controlled baking oven, it will be helpful to consider the wiring diagram shown in FIG. 13. Electrical power is supplied to the cooking appliance through a manually actuated double pole switch 46 connected to lines 47 and 48 of a conventional electrical cord adapted to be plugged into an ordinary electrical outlet. Upper heating elements 16 and 17 and lower heating elements 18 and 19 are connected in parallel circuit relationship during toasting and baking operations, one terminal of each heating unit being connected directly to switch 46. Energization of the heating units is controlled by thermostatically actuated switch 49 connected in circuit with switch 46 and with the other terminals of the heating units. In order to permit only upper heating units 16 and 17 to be energized for browning operations, a normally closed manually actuated switch 53 is connected in circuit with the lower heating units 18 and 19 and thermostatic switch 49. It will be understood the switch 53 remains closed during toasting and baking operations so that all four heating units may be cycled on and off by thermostatic switch 49 in accordance with temperature conditions within the cooking chamber. For browning, switch 53 is manually actuated to its open position and at the same time thermostatic switch 49 is set so that it remains closed regardless of temperature conditions in the cooking chamber.

When cooking appliance 1 is operated as a toaster thermostatic switch 49 is closed when toasting begins and opens when the material being toasted reaches a predetermined temperature. In order to provide means for opening door 3 automatically at the end of each toasting operation a latch actuating bimetallic member 51 is connected in parallel with thermostatic switch 49 so as to be heated and bend sufficiently to perform an unlatching function when all other switches in the control circuit are closed and thermostatic switch 49 opens. Means are also provided for automatically opening main switch 46 when bimetallic member 51 performs its unlatching function, as will be described in detail below. In order to prevent bimetallic member 51 from being actuated prematurely by leakage current it is desirable that the resistance of this portion of the circuit be considerably higher than the resistance of thermostatic switch 49. The resistance of the latter is quite small of course, but is not entirely negligible. Accordingly, a small resistor 52 is connected in series with bimetallic member 51.

When cooking appliance 1 is operated as a baking oven thermostatic switch 49 cycles between open and closed positions in accordance with the temperature of the air in cooking chamber 2 and door 3 remains closed until manually opened by the operator. Thus means are provided for disabling bimetallic member 51 so that it will not perform its unlatching function when thermostatic switch 49 opens. To accomplish this manually operated switch 50 is connected in series with resistor 52 and bimetallic member 51, and this switch is held in open position during baking operations.

Figure 5:
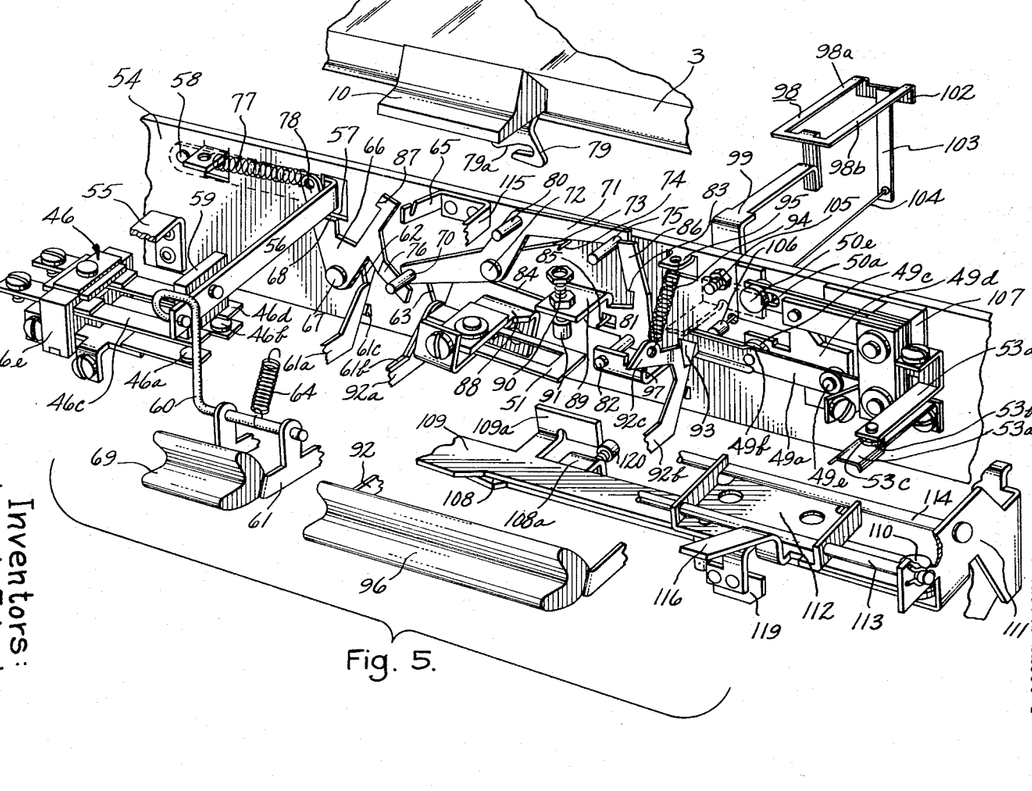
FIG. 5 is a fragmentary exploded perspective view showing the control mechanism of the cooking appliance.
Figure 6:
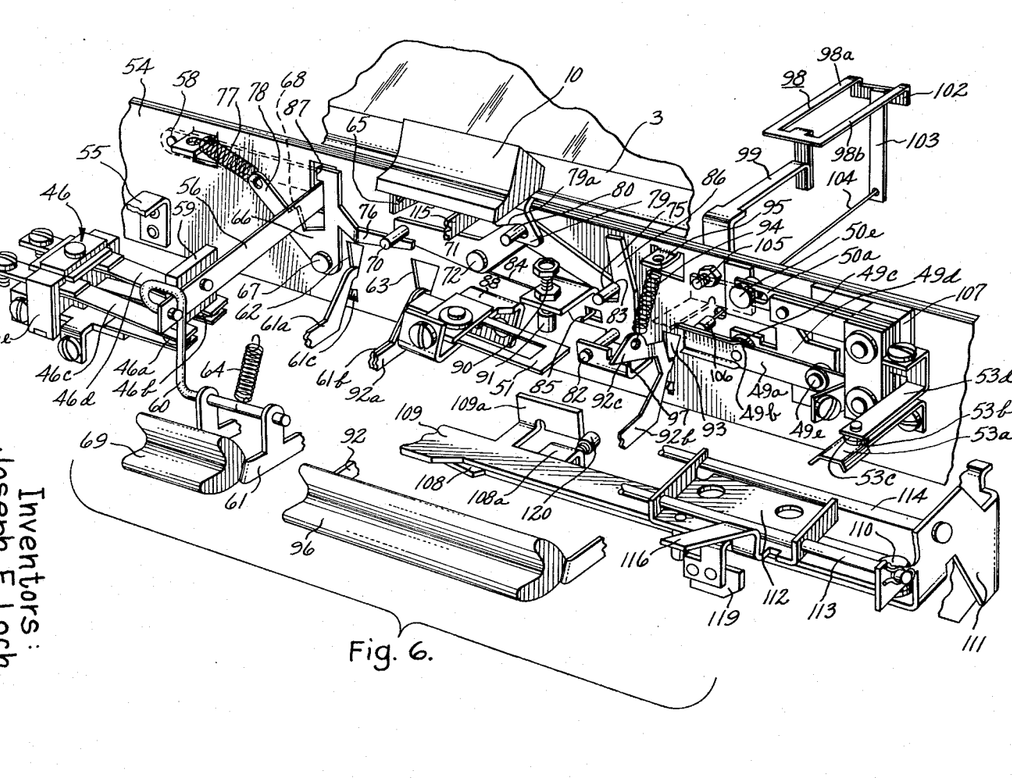
FIG. 6 is similar to FIG. 5 but shows the parts in a different position.

Referring now to FIGS. 2, 5 and 6, the control components of cooking appliance 1 are supported on a rectangular mounting plate 54 which forms the lower front wall of cooking chamber 2. Mounting plate 54 is secured to end walls 5 and 6 and extends across substantially the entire width of tthe appliance. Main switch 46 is supported on mounting plate 54 by a bracket 55 located near the left end portion of the mounting plate, as viewed in FIG. 2. Switch 46 includes a pair of fixed contacts 46a and 46b and a pair of movable contact arms 46c and 46d, all of which are supported on an insulated mounting block 46e. Contact arms 46c and 46d are movable downwardly into engagement with contacts 46a and 46b, respectively. The contact arms are actuated downwardly by operating arm 56 which extends through opening 57 in mounting plate 54 and is pivotally mounted thereon by means of a pivot pin 58. Thus arm 56 includes a portion parallel to and behind mounting plate 54, as viewed in FIG. 5, and a forwardly extending portion generally perpendicular to the mounting plate. An insulated actuating block 59 is pivotally mounted adjacent the free end of operating arm 56 and rests in engagement with contact arms 46c and 46d. Arm 56 is actuated by a link 60 pivotally mounted at one end to the free end of arm 56 and at its other end to a bifurcated lever 61 pivotally mounted for up and down movement on mounting plate 54. Leg portions 61a and 61b have hooked end portions which may be inserted through slots 62 and 63, respectively formed in mounting plate 54 so as to provide a loose but effective pivotal connection. Referring to FIG. 5, the hooked tip 61c of leg 61a projects through a small opening immediately below slot 62, and the end portion of leg 61b is arranged in a similar manner. Lever 61 is biased upwardly by a spring 64 secured at one end to link 60 and at its other end to bracket 65 which is secured to mounting plate 54. Upward movement of lever 61 is limited by a forwardly extending flange portion 8a of bottom wall 8 which overlies a portion of lever 61.

Interlock arm 66 is pivotally mounted on mounting plate 54 by means of pivot pin 67 and cooperates with arm 56 so as to perform two separate functions. First, when door 3 is open the parts are in the position shown in FIG. 5 and shoulder portions 68 of interlock arm 66 engages the lower surface of arm 56 and prevents it from moving downwardly thus making it impossible to close main switch 46. If the operator should attempt to depress handle portion 69 of lever 61 in an effort to energize the cooking appliance while the door 3 is open interlock arm 66 prevents arm 56 from moving downwardly and closing thte contacts of main switch 46.

Interlock arm 66 is held in the position shown in FIG. 5 when door 3 is open by pin 70 secured to one end of latch arm 71. Latch arm 71 is pivotally mounted on mounting plate 54 by means of pivot pin 72 and is biased in the clockwise direction, as viewed in FIG. 5, by a wire spring 73 secured at one end (not shown) to mounting plate 54 and at its free end a right angle portion 74 bears upwardly against the portion of latch arm 71 which carries latch pin 75. Pin 70 of the latch arm exerts a downward force on extending portion 76 of the interlock arm 66 which is sufficient to overcome the opposing force exerted by spring 77 which is secured to mounting plate 54 at one end and at its other end to portion 78 of latch arm 66.

As door 3 is closed a catch 79 secured to the lower edge thereof adjacent handle 10 strikes latch pin 80 on latch arm 71. Initially, contact with latch pin 80 is made by cam portion 79a of catch 79, and as the door closes latch arm 71 is caused to rotate clockwise about pivot 72 until the parts occupy the positions shown in FIG. 6. It will be seen that in the closed position of door 3 catch 79 and latch pin 80 are engaged so as to hold the door in closed position. The parts are held in the position shown in FIG. 6 by interlock lever 81 which is pivotally mounted on mounting plate 54 by means of pivot pin 82 and which is provided with a latching shoulder 83. Interlock lever 81 is biased to rotate counterclockwise about pivot pin 82 by means of a wire spring 84 having a fixed end secured with respect to mounting plate 54 and a free end 85 extending through an aperture in interlock lever 81 so as to be in engagement therewith. Preferably, wire springs 73 and 84 are formed from a single length of wire, the midportion of which is wound around pin 72. When door 3 is open interlock lever 81 is held in the position shown in FIG. 5 by engagement of its stop portion 86 with latch pin 75.

When the latch parts move into the positions shown in FIG. 6 the door 3 is held in closed position and portion 86 of interlock arm 66 is shifted out of interfering engagement with operating arm 56 by spring 77. Handle portion 69 of lever 61 may now be actuated downwardly to close main switch 46 so as to cause the parts to assume the positions shown in FIG. 6. Before main switch 46 is actuated to its closed position stop portion 87 of interlock arm 66 rests in engagement with a side portion of operating arm 56. Thus arm 56 is free to move downwardly when handle 69 is depressed, and when this is done portion 87 of interlock arm 66 rides over the top edge of arm 56 and holds switch 46 in closed position. To summarize, the heating units of cooking appliance 1 are energized by depressing handle 69, thus closing the contacts of main switch 46, and this can be done only after door 3 has been latched in closed position.

When door 3 is in the closed position as shown in FIG. 6, it and the contacts of main switch 46 may be opened either automatically at the conclusion of a toasting operation or manually at any time.

In the preceding description of FIG. 13, in which the wiring diagram and the general operation of cooking appliance 1 were described, bimetallic member 51 was described as performing an unlatching function at the conclusion of toasting operations. As shown in FIGS. 5 and 6, bimetallic member 51 is supported on mounting plate 54 by means of a mounting bracket 88 with its free end portion underlying a flanged portion 89 of interlock lever 81. Flanged portion 89 carries a calibration screw 90 provided at its lower end with a tip of insulating material positioned so as to be engaged by the end of bimetallic member 51 when the latter flexes upwardly under the influence of heat generated by the passage of current therethrough. Thus when bimetallic member 51 is energized at the conclusion of a toasting operation it bends upwardly into engagement with tip 91 and causes interlock lever 81 to pivot pin the clockwise direction sufficiently to disengage shoulder 83 from latch pin 75 and thus release the latching mechanism. Latch arm 71 is then rotated about pivot 72 in the counterclockwise direction so as to release latch in 80 from catch 79. At the same time pin 70 of the latch arm engages extending portion 76 of interlock arm 66 and shifts shoulder portion 87 thereof out of engagement with operating arm 56 which is then shifted upwardly by spring 64 so as to open the contacts of main switch 46. Thus door 3 is opened by spring 41, food rack 25 moves out of cooking chamber 2 in the manner previously described and the cooking appliance is de-energized.

It is desirable that means be provided for manually opening door 3 and de-energizing the cooking appliance either for the purpose of interrupting a toasting operation or removing food from the cooking chamber at the conclusion of baking and browning operations. Accordingly, a bifurcated lever 92 having leg portions 92a and 92b is pivotally supported on mounting plate 54 in the same manner in which bifurcated lever 61 is mounted thereon. Leg 92a is positioned in the same opening 63 in which leg 61b is located while leg 92b is positioned in an opening 93 in mounting plate 54. Leg 92b also includes a forwardly extending portion 92c to accommodate a spring 94 secured thereto and to a lug 95 on the mounting plate 54. Thus bifurcated lever 92, which is provided with a handle 96 is biased upwardly by spring 94. The lower edge of extending portion 92c of bifurcated lever 92 overlies a shoulder portion 97 on interlock lever 81 and is brought into contact therewith when handle portion 96 is depressed. When this is done interlock lever 81 is pivoted clockwise about pivot pin 82, thus disengaging shoulder 83 thereof from latch pin 75. Door 3 is then unlatched and main switch 46 is opened in the manner described above in connection with the operation of bimetallic latch 51.

Energization of heating units 16, 17, 18 and 19 is thermostatically controlled by a bimetallic heat responsive member 98 which is mounted in spaced relation between lower heating units 18 and 19 and the bottom surface of food rack 25. As shown in FIG. 7, heat responsive member 98 is in close proximity to the bottom of food rack 25 but it is sufficiently spaced therefrom that it never makes contact with either the rack or food supported thereon. An angle bracket 99 secured at one end to mounting plate 54 by means such as a screw 100 supports heat responsive member 98 in the position just described. The end portion of bracket 99 which supports member 98 is bent so that it may be secured to downwardly extending leg 101 of member 98, the connection preferably being made by spot welding. Heat responsive member 98 is stamped or formed from a single sheet of bimetallic material and includes a pair of relatively narrow arm portions 98a and 98b arranged in parallel relation to the food rack, a downwardly extending leg portion 101 which is substantially perpendicular thereto and an end flange portion 102. A downwardly extending actuator arm 103 is suitably secured to flange 102, by spot welding for example, and its lower end is in turn secured to an actuator rod 104. As heat responsive member 98 rises in temperature it flexes in the manner indicated in broken lines in FIG. 7 thus causing actuator rod 104 to move longitudinally. For purposes of adjustment during assembly, bracket 99 and hence rod 104 may be shifted through a limited range of positions by turning a set screw 105 mounted on mounting plate 54 so as to bear against the adjacent portion of bracket 99. Thus heat responsive member 98 may be positioned in proper relationship to rack 25.

It will now be apparent that during toasting operations heat responsive member 98 is subjected to heat radiated upwardly by heating units 18 and 19 and receives heat radiated downwardly by the surface of the food being toasted. It is also heated by ambient air temperature. Since ambient air temperature varies during toasting operations means for compensating for such variations are required. Also, some compensation must be provided for the radiated heat received by heat responsive member 98 from heating units 18 and 19. Leg 101 of heat responsive member 98 serves these purposes since it bows toward the position indicated in broken lines in FIG. 7 when heated. By virtue of its vertical position, compensating leg 101 receives relatively little radiated heat from the food and is primarily responsive to air temperature and heat radiated from heating units 18 and 19. During toasting operations the heat received by heat responsive member 98 from heating units 18 and 19 is substantially constant while the heat received from the food being toasted varies in accordance with its brownness. Thus at any moment during a toasting operation the position of member 98 and actuator rod 104 is a function of the brownness of the food. Therefore the movement of rod 104 can be utilized to terminate the toasting cycle when the food reaches a predetermined degree of brownness. Heat responsive member 98 per se is the invention of Theodore E. Andrews, and is disclosed and claimed in application Serial No. 164,775, filed January 8, 1962 and assigned to the assignee of the present application.

It should be understood that compensating leg 101 does not fully compensate for the heat energy received by heat responsive member 98 from heating units 18 and 19, and in fact it is desirable that it not do so for two reasons.

First, the heat energy transmitted by the surface of the toast is relatively low in magnitude and is insufficient to actuate heat responsive member 98 through the range of movement required for switch actuation. The additional energy required for this purpose is supplied by heating units 18 and 19.

Second, heat responsive member 98 functions to control the appliance during baking operations as well as toasting operations. When heat responsive member 98 is used as a baking oven control the food is supported in chamber 2 so that it is not in heat transfer relation with the thermostat, for example by means of an imperforate tray, described below, arranged to rest on rack 25 so as to shield and space the food from the heat responsive member. Under these circumstances heat responsive member receives heat by conduction from the surrounding air and also heat radiated from heating units 18 and 19, but primarily from the latter. Since the movement of compensating leg 101 only partially compensates for the movement of arm portions 98a and 98b, heat responsive member 98 flexes towards the position indicated in broken lines in FIG. 7 when heating units 18 and 19 are energized and returns toward the position shown in full lines when the heating units are de-energized. By arranging actuator rod 104 to operate a manually positioned switch connected in series with the heating units, as described below, the air temperature in chamber 2 may be maintained substantially at a predetermined level.

Actuator rod 104 extends through an aperture in mounting plate 54 and is provided at its end with a tip 106 made of insulating material arranged to engage a flexible switch arm 49a. Mounted on switch arm 49a is a contact 49b arranged to mate with a contact 49c mounted on a support member 49d. These switch elements make up thermostatic switch 49 shown in the wiring diagram illustrated in FIG. 13. Support 49d is mounted on flexible arm 49a by a fastener 49e located in spaced relation with respect to the fixed end of arm 49a, which is secured in fixed relation to switch stack 107. Fastener 49e includes suitable insulating material for electrically insulating support 49d from flexible arm 49a. The relationship of the parts of switch 49 are well shown in FIG. 9. Switch stack 107 also supports a manually operable switch arm 50a on which is mounted a contact 50b arranged to mate with a fixed contact 50c carried by arm 50d. These switch elements make up manually operable switch 50 illustrated in FIG. 13. Switch arm 50a is flexible and carries adjacent its free end a button 50e made of insulating material. Also mounted on switch stack 107 is a flexible switch arm 53a carrying a movable contact 53b arranged to mate with a fixed contact 53c supported on a fixed arm 53d. These switch parts make up switch 53 illustrated in FIG. 13.

Figure 10:
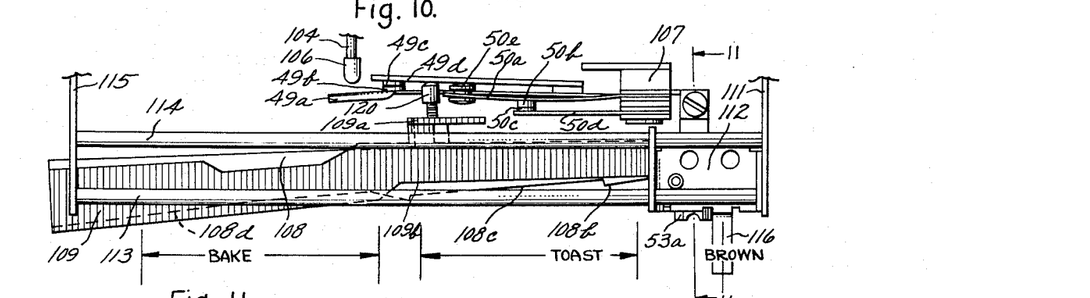
FIG. 10 is similar to FIG. 8 but shows the parts in still a different position.
Figure 11:
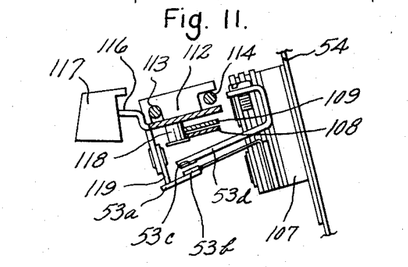
FIG. 11 is a cross-sectional view taken along the line 11—11 as shown in FIG. 10.

Manual selection of the cooking operation to be performed in cooking appliance 1 as well as selection of the oven temperature or degree of brownness during toasting operations is provided by a pair of elongated cams 108 and 109 pivotally mounted by means of a pivot pin 110 on a flange portion 111 of mounting plate 54. Flanged portion 111 extends forwardly from the right-hand end of mounting plate 54, as viewed in FIG. 5. Cams 108 and 109 are arranged to be actuated by a cam actuator 112 mounted for sliding movement along the cam surfaces of the cams. Thus cam actuator 112 is mounted for sliding movement on a pair of rods 113 and 114 which are secured at one end to mounting plate portion 111 and at the other end to bracket 115 which in turn is secured to and extends forwardly from mounting plate 54, adjacent the mid-portion thereof. Cam actuator 112 is free to slide along the entire length of rods 113 and 114 and is provided with a handle portion 116 on which a handle 117 may be mounted in any suitable manner. As best shown in FIG. 11, a pin 118 is carried by and extends downwardly from cam actuator 112 and rides in engagement with the cam surfaces of cams 108 and 109. Cam actuator 112 also carries a switch actuator 119 fixedly secured thereto and positioned so that it engages and shifts downwardly flexible switch arm 53a when the cam actuator is shifted as far to the right as possible as viewed in FIG. 10. Thus switch contacts 53b and 53c are opened when cam actuator 112 is in this position and remain closed when the actuator is shifted to any other position along its path of movement.

The function of cam 108 is to position contact 49c throughout a range of positions with respect to contact 49b so as to regulate the temperature at which heat responsive member 98 actuates these contacts between open and closed position. For this purpose a flanged portion 108a extends from the rear of cam 108 and carries a projecting button 120 made of insulating material and arranged to engage contact supporting member 49d. Preferably button 120 is mounted on flange 108a by means of a screw for purposes of calibration.

Figure 8:
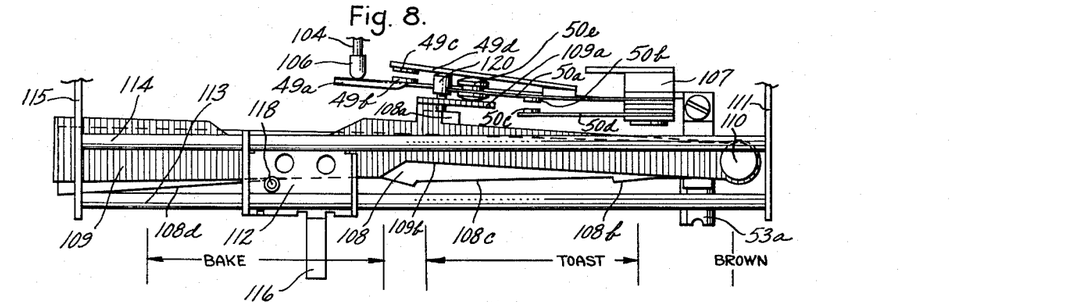
FIG. 8 is a fragmentary top plan view of the control mechanism shown in FIG. 5.
Figure 9:
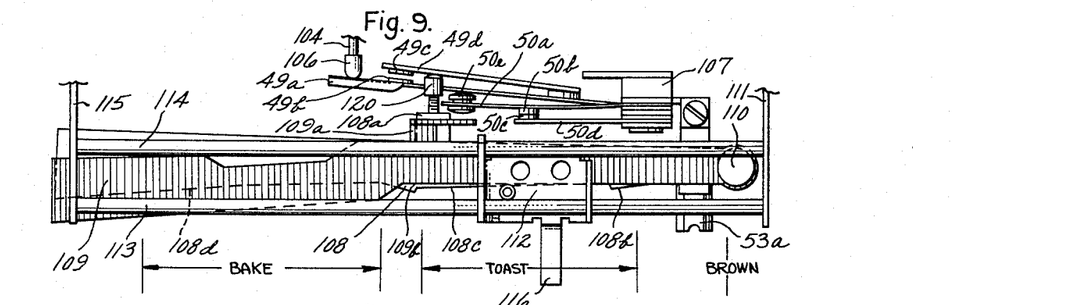
FIG. 9 is similar to FIG. 8 but shows the parts in a different position.

As shown in FIGS. 8 and 9, cam 108 is provided with three distinct cam surfaces 108b, 108c and 108d extending along the length of the cam. Each of these cam surfaces is inclined with respect to the path of movement of cam actuator 112 and each is useful during a particular cooking operation. Thus when actuator 112 is placed in the "brown" position indicated in FIG. 10, cam 108 pivots counterclockwise and allows contact 49c to shift in the same direction to such an extent that contact 49b remains in engagement therewith regardless of the temperature of heat responsive member 98. In this position actuator 112 also opens contacts 53b and 53c thus deenergizing lower heating units 18 and 19 while upper heating units 16 and 17 remain continuously energized. Obviously no range of temperature positions is necessary during browning and the rising slope of cam 108b is provided only to provide a definite transition point or "feel" between the "brown" setting and the range of "toast" settings. Cam 108c slopes gradually throughout its length and is arranged to provide a range of "toast" settings varying from very light to very dark. The setting varies from dark to light as cam actuator 112 is moved from right to left along cam 108c, as viewed in FIG. 9. The configuration of cam surface 108d is generally similar to the configuration of surface 108c and is arranged to provide a range of baking temperatures varying from 200° to 500°, the latter setting being at the extreme right-hand end of the cam surface as viewed in FIG. 8.

As previously mentioned in the description of FIG. 13, the unlatching bimetal 51 must be disabled during baking operations or otherwise the door 3 would be opened on the first cycle of switch contacts 49b and 49c. Cam 109 is arranged to perform this function, as indicated in FIG. 8. Cam 109 includes a flanged cam portion 109a arranged to engage button 50e on switch arm 50a and open contacts 50b and 50c when cam actuator 112 is in the range of "bake" positions provided by cam 108d. Cam 109 merely provides a simple "on"-"off" function, and it will be understood that when actuator 112 is in the "brown" position or anywhere in the toasting range, flange 109a remains out of engagement with button 50e. Cam surface 109b is shaped so as to accomplish this purpose, as will be evident from FIG. 9 and FIG. 10. When cam actuator 112 is shifted into the baking range, cam 109 is pivoted clockwise about its pivot point and shifts button 50e sufficiently to maintain contacts 50b and 50c in open position at any setting in the baking range.

Figure 12:
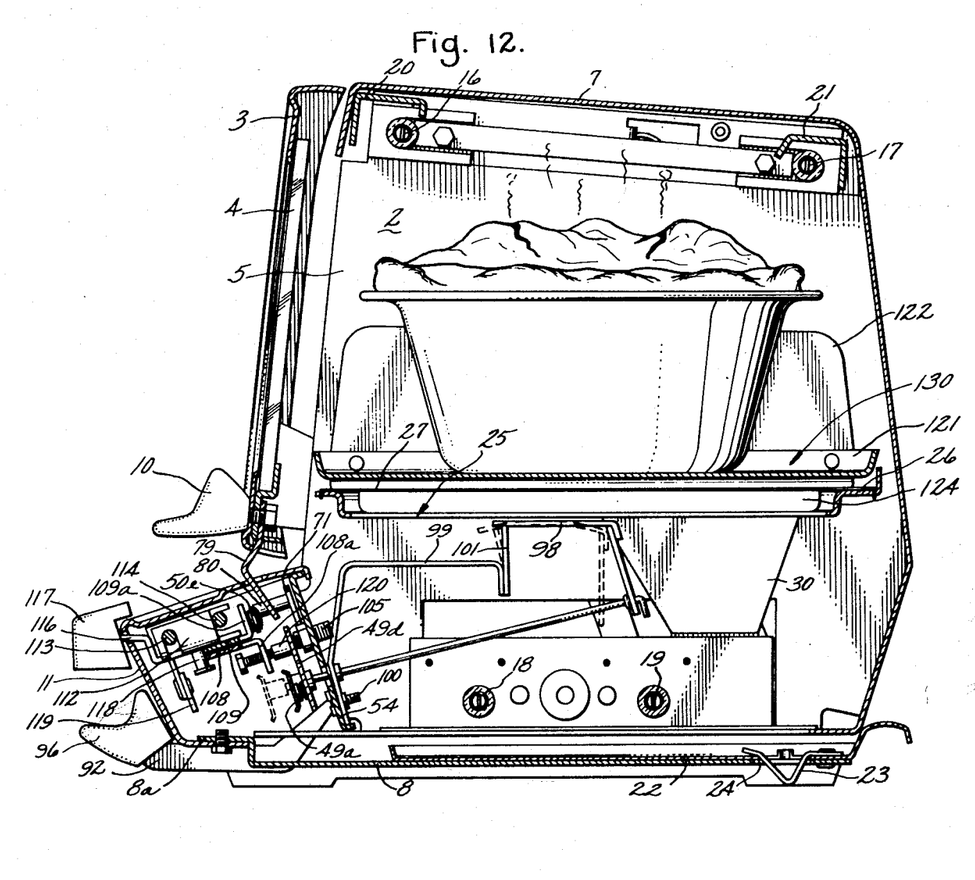
FIG. 12 is similar to FIG. 7 but shows a pot pie in the cooking chamber rather than a piece of toast.
Figures 14, 15:
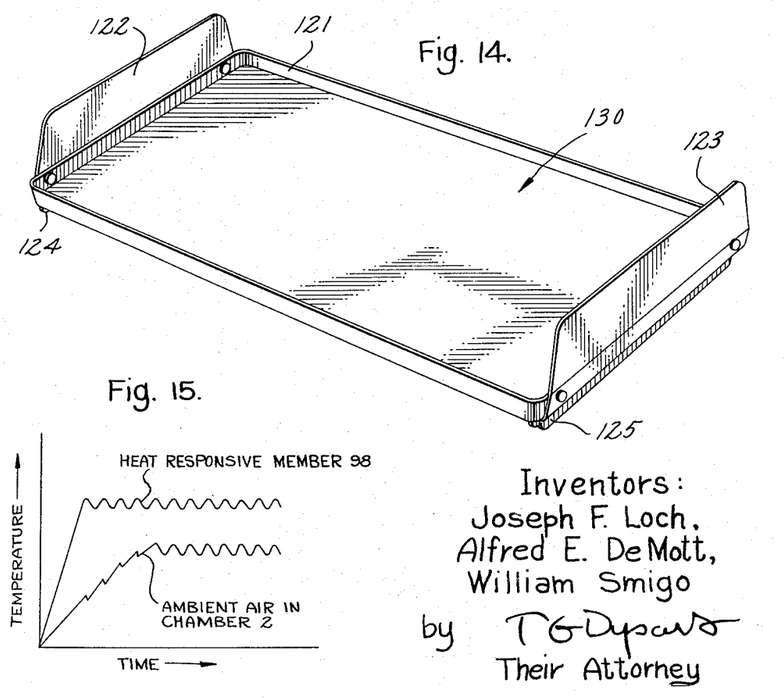
FIG. 14 is a perspective view of a baking tray which may be supported in the cooking chamber of the appliance.
FIG. 15 is a graphical illustration of certain temperature changes when the appliance is used for baking.

During toasting operations it is of course essential that the heat responsive member 98 be exposed to the surface of the bread being toasted. Heat responsive member 98 flexes in response to the surface temperature of the bread, which of course increases as as the degree of brownness increases. However, during baking operations the function of heat responsive member 98 is to control the energization of heating units 16, 17, 18 and 19 so as to regulate the air temperature in the cooking chamber. During baking it is necessary that heat transfer between the food product in chamber 2 and heat responsive member 98 be substantially prevented so that member 98 responds primarily to heat radiated by heating units 18 and 19 and to some extent to air temperature. Also it is desirable during baking operations to provide some means for collecting drippings from the food so that they do not collect in the bottom of the cooking chamber. Accordingly, a shielding means such as a baking tray 130, shown in FIG. 14, is provided for use during baking operations. Tray 130 includes a raised marginal edge 121, side handles 122 and 123 and a pair of guiding and supporting rails 124 and 125. Rails 124 and 125 fit within the frame of food rack 25 and hold the tray securely in place. Also, rails 124 and 125 support the tray somewhat above the top surface of rack 25 and thus increase the spacing between food products being baked and heat responsive member 98. Thus tray 120 is selectively operable to substantially prevent heat transfer between the food and heat responsive member 98, being placed in the position shown in FIG. 9 during baking but removed from chamber 2 during toasting. During baking heat responsive member 98 causes contacts 49b and 49c to be cycled between open and closed positions so as to regulate the air temperature in the cooking chamber in accordance with the temperature setting of cam actuator 112. As shown in FIG. 12, cooking chamber 2 is sufficiently large to accommodate many items requiring baking, such as meat pies, meat loaves and loaf cakes.

In operation during baking heat responsive member 98 functions in the following manner (graphically illustrated in FIG. 15) to maintain the pre-selected baking temperature in chamber 2. The gap between tip 106 of actuator rod 104 and flexible arm 49a, which is initially set by positioning actuator 112, determines the baking temperature; the greater the gap, the higher the temperature. During the initial heating cycle member 98 is heated by radiation from heating units 18 and 19 as well as the surrounding or ambient air and therefore its temperature rises faster and higher than ambient air temperature. The longer the initial heating cycle lasts the greater the temperature difference between member 98 and ambient air becomes. At the end of the first heating cycle the contacts of switch 49 are opened by actuator rod 104, the heating units are de-energized, and member 98 begins to cool. Its rate of cooling is a function of the degree to which its temperature exceeds ambient air temperature. Further, the ambient air begins to cool and its rate of cooling is a function of the rate at which the walls and other parts of the cooking appliance lose heat to the surrounding atmosphere. The latter rate of course is higher when the cooking appliance is relatively hot than when it is relatively cooler. Thus the time interval required for member 98 to cool sufficiently to allow the contact of switch 49 to close is relatively short when a high baking temperature has been selected, and this is true with respect to each succeeding cycle of operation. The result is that the heating units remain de-energized for relatively short intervals in the former case (high temperature) and for relatively long intervals in the latter case (low temperature). In this way heat responsive member 98 acts to control oven air temperature even though it is primarily responsive to radiated heat from heating units 18 and 19.

In using cooking appliance 1, it is merely necessary to press handle 96 so as to open door 3, place the food to be heated on the food rack 25 using tray 130 if baking is to be done, and close door 3. Handle 117 of actuator 112 is then placed in the appropriate position along its path of movement, depending upon the operation to be performed, and finally handle 69 is depressed to energize the heating circuit. If a toasting operation has been selected door 3 will open automatically when the toast reaches the desired degree of brownness and main switch 46 will be opened so as to de-energize the heating circuit. If a single piece of toast is to be made, it is of course necessary to place it on the right side of the bread rack 25, as viewed in FIG. 2, so that it will be in heat transfer relation with heat responsive member 98. During baking and browning operations, it is necessary to depress handle 96 upon completion of the cooking operation so as to manually unlatch door 3 thus allowing it and the main switch 46 to open.

While we have disclosed a particular embodiment of our invention, we do not desire the invention to be limited to the specific construction disclosed, and we intend by the appended claims to cover all modifications within the true scope of the invention.

What we claim is:

1. A cooking appliance comprising wall means forming a cooking chamber having a front opening, a door for said opening carried by said wall means, latch means for releasably holding said door in closed position, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, first switch means and second switch means connected in series circuit relation with said heating means, means operated by said control means for actuating said first switch means so as to regulate the energization of said heating means in accordance with the temperature of said control means, manually operable means for opening and closing said second switch means, means for releasing said latch means actuated in response to the opening of said first switch means by said first switch actuating means and manually operable means for disabling said releasing means.

2. A cooking appliance as defined in claim 1 including third switch means in series circuit relationship with said second heating means, said third switch means normally being in closed position, and manually actuated means for opening said third switch means so that food may be heated in said cooking chamber solely by said first heating means.

3. A cooking appliance as defined in claim 1 in which said means for releasing said latch means comprises a bimetallic element connected in parallel circuit relationship with said first switch means so as to be heated by current flowing therethrough and thereby bend so as to perform its unlatching function when said first switch means opens, and said means for disabling said releasing means comprises a switch in series circuit relationship with said bimetallic element.

4. A cooking appliance as defined in claim 1 including linkage means connecting said rack to said door for moving said rack forwardly through said front opening as the door moves to open position.

5. A cooking appliance comprising wall means forming a cooking chamber having a front opening, a door for said opening carried by said wall means, first latch means for releasably holding said door in closed position, a horizontal food supporting rack located in said chamber, first electric heating means mounted in said chamber above and spaced from said rack, second electric heating means mounted in said chamber below and spaced from said rack, heat responsive control means supported between said rack and said second heating means, first switch means having normally closed contacts and second switch means having normally open contacts connected in series circuit relation with said heating means, means actuated by said control means for opening said first switch means when the temperature of said control means rises to a predetermined level during cooking operations, a switch operating member manually movable into engagement with said second switch means so as to close said contacts, second releasable latch means for holding said member in engagement with said second switch means, a bimetallic element operable when heated to release said first latch means, said second latch means being interconnected with said first latch means so as to be released upon release of said first latch means, and means for supplying heat to said bimetallic element only when the contacts of said first switch means are open and the contacts of said second switch means are closed.

6. A cooking appliance as defined in claim 5 in which said second releasable latch means comprises a pivotally mounted arm movable between a latching position and a released position, said arm having a shoulder portion engageable with said switch operating member so as to hold said member in engagement with said second switch means in its latching position, said arm also having a stop portion engageable with said member so as to prevent said member from engaging said second switch when said arm is in its released position, and an extending portion on said arm interconnected with said first latch means.

7. A cooking appliance comprising wall means forming a cooking chamber having a front opening, a door for said opening carried by said wall means, first latch means for releasably holding said door in closed position, a horizontal food supporting rack located in said chamber, first electric heating means mounted in said chamber above and spaced from said rack, second electric heating means mounted in said chamber below and spaced from said rack, heat responsive control means supported between said rack and said second heating means, first switch means having normally closed contacts and second switch means having normally open contacts connected in series circuit relation with said heating means, means actuated by said control means for opening said first switch means when the temperature of said control means rises to a predetermined level during cooking operations, a member manually movable into engagement with said second switch means so as to close said contacts, second releasable latch means for holding said member in engagement with said second switch means, a bimetallic element operable when heated to release said first latch means, said second latch means being interconnected with said first latch means so as to be released upon release of said first latch means, means for supplying heat to said bimetallic element only when the contacts of said first switch means are open and the contacts of said second switch means are closed, and manually operable means for releasing said first latch means at any time.

8. A cooking appliance as defined in claim 7 including manually operable means for positioning said first switch means so as to provide a range of manually selectable temperatures at which said first switch means opens.

9. A cooking appliance as defined in claim 7 in which said bimetallic element is connected in parallel circuit relationship with said first switch means so that said bimetallic element is heated by current flowing therethrough when said second switch is closed and said first switch opens in response to a rise in temperature of said control means to said predetermined level.

10. A cooking appliance as defined in claim 7 in which said heat responsive control means includes a bimetallic thermostat in heat transfer relation with the surface of a slice of bread or the like supported on said rack, and said means actuated by said control means includes an actuator rod engageable with said first switch means and movable through a range of positions in response to changes in the temperature of said thermostat.

11. A cooking appliance as defined in claim 7 including a catch on said door and in which said latch means includes a latch arm pivotally mounted at its mid-portion on a pivot pin carried by said wall means, and movable between a latched position and an unlatched position, a first latch pin secured to one end of said lever, a second latch pin secured to said lever between said pivot pin and said first latch pin, said second latch pin being releasably engageable with said catch, and a third latch pin secured to the other end of said lever, an interlock lever releasably engageable with said first latch pin, said bimetallic element and said manually operable means being engageable with said interlock lever so as to release said first latch pin, said third latch pin being engageable to release said second latch means upon release of said first latch pin, and spring means biasing said latch arm to its unlatched position.

12. A cooking appliance as defined in claim 7 in which said bimetallic element is connected in parallel circuit relationship with said first switch means so that said bimetallic element is heated by current flowing therethrough when said second switch is closed and said first switch opens in response to a rise in temperature of said control means to said predetermined level, and which further includes manually operable third switch means in series circuit relationship with said bimetallic element.

13. A cooking appliance as defined in claim 7 including linkage means connecting said rack to said door for moving said rack forwardly through said front opening as the door moves to open position.

14. A cooking appliance comprising wall means forming a cooking chamber having a front opening, a door for said opening carried by said wall means, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, switch means connected in circuit with said heating means, means operated by said control means for actuating said switch means so as to regulate the energization of said heating means in accordance with the temperature of said control means, and selectively operable means for substantially preventing the transfer of heat by radiation between said control means and food supported on said rack, 15. A cooking appliance comprising wall means forming a cooking chamber having a front opening, a door for said opening carried by said wall means, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, switch means connected in circuit with said heating means, means operated by said control means for actuating said switch means so as to regulate the energization of said heating means in accordance with the temperature of said control means, manually operable means for varying the temperature setting of said switch means, and selectively operable means for substantially preventing the transfer of heat by radiation between said control means and food supported on said rack.

16. A cooking appliance comprising wall means forming a cooking chamber having a front opening, a door for said opening carried by said wall means, latch means for releasably holding said door in closed position, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, first switch means and second means connected in series circuit relation with said heating means, means operated by said control means for actuating said first switch means so as to regulate the energization of said heating means in accordance with the temperature of said control means, manually operable means for varying the temperature setting of said switch means, manually operable means for opening and closing said second switch means, means for releasing said latch means actuated in response to the opening of said first switch means at the end of a toasting operation, and selectively operable means for substantially preventing the transfer of heat by radiation between said control means and food supported on said rack and manually operable means for disabling said releasing means during baking operations.

17. A cooking appliance comprising wall means forming a cooking chamber having a front opening, a door for said opening carried by said wall means, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, switch means connected in circuit with said heating means, means operated by said control means for actuating said switch means so as to regulate the energization of said heating means in accordance with the temperature of said control means, and shielding means removably positionable between said control means and food supported by said rack.

18. A cooking appliance as defined in claim 17 in which said control means comprises a bimetallic member and said switch means includes a first contact carried by a flexible switch arm and a second contact engageable therewith, said means operated by said control means being engageable with said switch arm, and further including manually operable means for shifting the position of said second contact with respect to said means operated by said control means so as to provide a range of temperature settings.

19. A cooking appliance comprising wall means forming a cooking chamber having a front opening, a door for said opening carried by said wall means, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, switch means connected in circuit with said heating means, means operated by said control means for actuating said switch means so as to regulate the energization of said heating means in accordance with the temperature of said control means, manually operable means for varying the temperature setting of said switch means, and shielding means removably positionable between said control means and food supported by said rack.

20. A cooking appliance comprising wall means forming a cooking chamber having a front opening, a door for said opening carried by said wall means, latch means for releasably holding said door in closed position, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, first switch means and second switch means connected in series circuit relation with said heating means, means operated by said control means for actuating said first switch means so as to regulate the energization of said heating means in accordance with the temperature of said control means, manually operable means for varying the temperature setting of said switch means, manually operable means for opening and closing said second switch means, means for releasing said latch means actuated in response to the opening of said first switch means at the end of a toasting operation, shielding means removably positionable between said control means and food supported by said rack during baking operations, and manually operable means for disabling said releasing means during baking operations.

21. A cooking appliance comprising wall means forming a cooking chamber having a front opening, a door for said opening carried by said wall means, latch means for releasably holding said door in closed position, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, first switch means and second switch means connected in series circuit relation with said heating means, means operated by said control means for actuating said first switch means so as to regulate the energization of said heating means in accordance with the temperature of said control means, manually operable means for opening and closing said second switch means, means for releasing said latch means upon de-energization of said heating means by said first switch means at the end of a toasting operation, shielding means removably positionable between said control means and food supported by said rack during baking operations, and manually operable means for disabling said releasing means during baking operations.

22. A cooking appliance as defined in claim 21 in which said shielding means comprises a tray generally corresponding in size and shape to that of said rack and arranged to be supported thereon.

23. A cooking appliance comprising wall means forming a cooking chamber having a front opening, a door for said opening carried by said wall means, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, switch means including first and second cooperating movable contacts connected in series circuit relation with said heating means, means for varying the position of said first contact in accordance with the temperature of said control means, a cam pivotally supported by said wall means, means carried by said cam for varying the position of said second contact in accordance with the pivotal position of said cam, said cam having an elongated cam surface along one edge thereof, and actuating means supported by said wall means for linear movement in sliding engagement with said cam surface.

24. A cooking appliance as defined in claim 23 including a normally closed switch in series circuit relationship with said second heating means, and operating means carried by said actuating means for opening said normally closed switch when said actuating means is shifted to a predetermined position so that food may be heated in said cooking chamber solely by said first heating means.

25. A cooking appliance comprising wall means forming a cooking chamber having a front opening, a door for said opening carried by said wall means, latch means for releasably holding said door in closed position, a horizontal food supporting rack located in said chamber, first electric heating means mounted in said chamber above and in spaced relation to said rack, second electric heating means mounted in said chamber and in spaced relation to said rack, heat responsive control means supported between said rack and said second heating means, first switch means including first and second cooperating movable contacts connected in series circuit relation with said heating means, means for varying the position of said first contact in accordance with the temperature of said control means, a first cam pivotally supported on a pivot pin carried by said wall means, means carried by said first cam for varying the position of said second contact in accordance with the pivotal position of said first cam, said first cam having first and second elongated cam surfaces along one edge thereof in end-to-end relationship, each of said first and second cam surfaces being sloped so as to provide a range of positions through which said second contact may be moved, a bimetallic element connected in parallel circuit relationship with said first switch means so as to be heated by current flowing therethrough and thereby bend so as to release said latch means when said heating means are energized and said first switch means opens, second switch means in series circuit relationship with said bimetallic element, actuating means supported by said wall means for linear movement in sliding engagement with said first and second cam surfaces, a second cam pivotally supported on said pivot pin, said second cam having third and fourth elongated cam surfaces along one edge thereof generally co-extensive with said first and second cam surfaces respectively, said actuating means being also in sliding engagement with said third and fourth cam surfaces, and means carried by said second cam for causing said second switch means to open when said actuating means is in engagement with said third cam surface and to close when said actuating means is in engagement with said fourth cam surface, whereby said bimetallic element is prevented from performing its unlatching function when said actuating means is in engagement with said first cam portion.

26. A cooking appliance as defined in claim 25 including linkage means connecting said rack to said door for moving said rack forwardly through said front opening as the door moves to open position.

27. A cooking appliance which may be utilized for toasting and baking operations comprising wall means for forming a cooking chamber having a front opening, a door for said opening carried by said wall means, latch means for releasably holding said door in closed position, a horizontal food supporting rack located in said chamber, first electric heating means mounted in said chamber above and in spaced relation to said rack, second electric heating means mounted in said chamber below and in spaced relation to said rack, heat responsive control means supported between said rack and said second heating means, first switch means and second switch means connected in series circuit relation with said heating means, means operated by said control means for actuating said first switch means so as to regulate the energization of said heating means in accordance with the temperature of said control means, manually operable means for opening and closing said second switch means, means for releasing said latch means including a heat responsive element connected in parallel circuit relationship with said first switch means so as to be heated by current flowing therethrough and thereby move so as to perform its unlatching function when said first switch means opens, and manually operable means for disabling said heat responsive element including a switch in series circuit relationship with said element.

References Cited in the file of this patent

UNITED STATES PATENTS

| | | |
|---|---|---|
| 1,751,219 | Seamon | Mar. 18, 1930 |
| 1,937,562 | Ginder | Dec. 5, 1933 |
| 1,957,343 | Gurxthal et al. | May 1, 1934 |
| 2,478,253 | Doner | Aug. 9, 1949 |
| 2,578,034 | Baltzell | Dec. 11, 1951 |
| 2,719,479 | Rodwick | Oct. 4, 1955 |
| 2,738,723 | Jennett | Mar. 20, 1956 |
| 2,763,199 | Mueller | Sept. 18, 1956 |